ISAAC D. CUSTER.
Grape Trellis.
No. 118,348.        Patented Aug. 22, 1871.
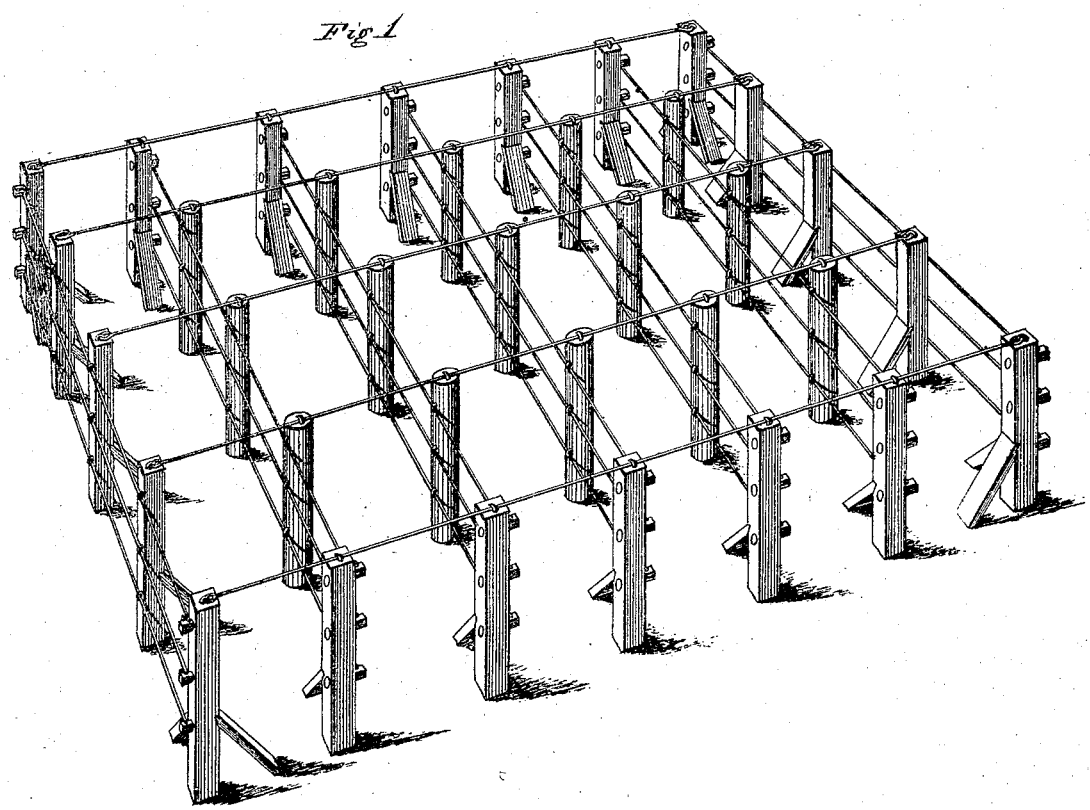
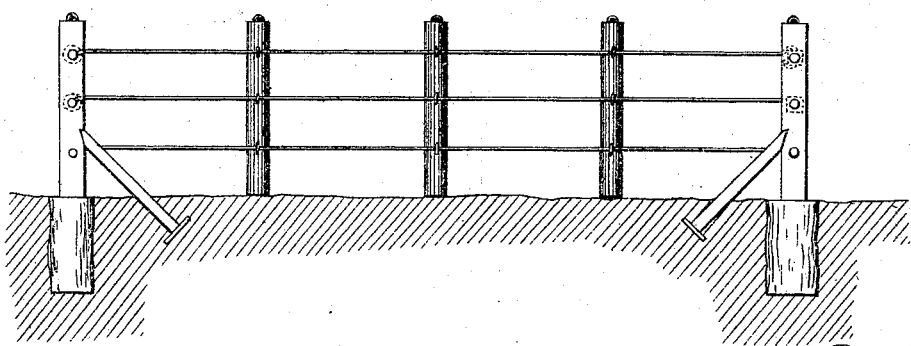

UNITED STATES PATENT OFFICE.

ISAAC D. CUSTER, OF DAVENPORT, IOWA.

IMPROVEMENT IN GRAPE-TRELLISES.

Specification forming part of Letters Patent No. 118,348, dated August 22, 1871.

*To all whom it may concern:*

Be it known that I, ISAAC D. CUSTER, of Davenport, in the county of Scott and State of Iowa, have invented certain Improvements in a Grape-Trellis, of which the following is a specification, reference being had to the accompanying drawing.

My invention consists in a novel combination and arrangement of upright posts and bars with horizontal wires attached thereto, whereby I produce a light rigid trellis which admits of the passage of a horse and cultivator through between the rows of vines.

The drawing represents a perspective view of a trellis constructed on my plan.

In constructing my trellis I lay off the ground to be covered in the form of a rectangle, and inclose the same by rows of stout posts $b$ and $d$ set firmly into the ground and extending to a height of about seven feet. The posts $b$, along two opposite sides of the rectangle, I place at about six or seven feet apart, and the posts $d$, on the remaining two sides, at about twenty-five feet apart, and all of the posts I brace strongly on the inside so that they will not be drawn out of position. Each post $b$ I connect by three horizontal wires, $f$, one above another, with the corresponding post in the opposite row, as shown, thus forming parallel rows of wires, three in each row. The wires may be attached to the posts in any suitable manner, provision being, of course, made for tightening them up when necessary. The corresponding or opposite posts $d$ in the two rows I connect with each other by a single wire, $g$, secured to their upper ends, as shown, these wires running above and at right angles to the others. To each row or series of wires $f$ I secure, by means of staples, a number of upright bars, $h$, each having its upper end secured to one of the cross-wires $g$, as shown, while its lower end rests upon the surface of the ground. The cross-wires $g$ are fastened to the tops of the bars $h$ by means of staples $i$, which are driven down so as to form a bend or flexure in the wire, and thus prevent the staple from moving thereon. The bars $h$, thus arranged, are held rigidly in position by the wires $f$ and $g$, and at the same time the bars in turn support and sustain the wires $f$, upon which the vines are trained, and prevent them from sagging down. The wires $g$, being at the top of the posts and bars, seven feet from the ground, admit of a horse being driven through between the different sets of wires $f$ and the vines thereon, so that in a vineyard where my trellis is used the vines may be readily cultivated.

By my method of supporting the bars $h$ I am enabled to produce a rigid strong trellis with very few large posts, and consequently to construct the trellis at a much less cost than by any plan heretofore in use.

Having thus described my invention, what I claim is—

The combination of the fixed posts $b$ with the wires $f$ attached, and the loose supporting-bars $h$ with the transverse wires $g$ secured to the top thereof, all arranged substantially as shown and described.

ISAAC D. CUSTER.

Witnesses:
M. A. McGONEGAL,
W. L. CARROLL.